US009862379B2

(12) United States Patent
Seo et al.

(10) Patent No.: US 9,862,379 B2
(45) Date of Patent: Jan. 9, 2018

(54) PARKING ASSIST APPARATUS AND METHOD FOR CONTROLLING VEHICLE SPEED (71) Applicant: HYUNDAI MOTOR COMPANY, Seoul (KR)

(72) Inventors: Gil Won Seo, Hwaseong-si (KR); Chan Hee Jung, Anyang-si (KR); Wan Seok Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/189,333

(22) Filed: Jun. 22, 2016

(65) Prior Publication Data

US 2017/0129485 A1 May 11, 2017

(30) Foreign Application Priority Data

Nov. 11, 2015 (KR) .................. 10-2015-0158352

(51) Int. Cl.
*B60W 30/06* (2006.01)
*B60W 10/06* (2006.01)
*B60W 10/18* (2012.01)
*B60W 50/08* (2012.01)
*B60W 50/12* (2012.01)
*B62D 15/02* (2006.01)

(52) U.S. Cl.
CPC ............ *B60W 30/06* (2013.01); *B60W 10/06* (2013.01); *B60W 10/18* (2013.01); *B60W 50/082* (2013.01); *B60W 50/085* (2013.01); *B60W 50/12* (2013.01); *B62D 15/027* (2013.01); *B62D 15/0285* (2013.01); *B60W* *2400/00* (2013.01); *B60W 2540/10* (2013.01); *B60W 2540/12* (2013.01); *B60W 2550/10* (2013.01); *B60W 2710/0666* (2013.01)

(58) Field of Classification Search
CPC ...... B60W 30/06; B60W 10/18; B60W 50/12; B60W 10/06; B60W 50/082; B60W 50/085; B60W 2540/12; B60W 2710/0666; B60W 2550/10; B60W 2400/00; B60W 2540/10
USPC ......................................................... 701/27
See application file for complete search history.

(56) References Cited

FOREIGN PATENT DOCUMENTS

| JP | 2000-136738 A | 5/2000 |
|---|---|---|
| JP | 2004-284530 A | 10/2004 |
| JP | 2004-352117 A | 12/2004 |
| JP | 2008-137442 A | 6/2008 |
| JP | 2008-149853 A | 7/2008 |
| JP | 2009-073450 A | 4/2009 |
| JP | 2011-079372 A | 4/2011 |
| JP | 2012-021643 A | 2/2012 |
| JP | 2013-082376 A | 5/2013 |
| JP | 2013-126868 A | 6/2013 |
| JP | 2013-241087 A | 12/2013 |

(Continued)

*Primary Examiner* — Brian P Sweeney
(74) *Attorney, Agent, or Firm* — McDermott Will & Emery LLP (57) ABSTRACT A parking assist apparatus includes a parking switch for instructing an execution or a release of a parking assist function, a sensor for searching a parking slot, and a controller for searching the parking slot using the sensor when the parking switch is turned on, entering a vehicle speed control mode to check an interface operation by a driver, controlling vehicle speed according to the interface operation, and performing a parking assist.

15 Claims, 6 Drawing Sheets

(56) References Cited

FOREIGN PATENT DOCUMENTS

| JP | 2013241087 A | * 12/2013 |
|---|---|---|
| KR | 10-2012-0069052 A | 6/2012 |
| KR | 10-1371478 B1 | 3/2014 |

* cited by examiner

PARKING ASSIST APPARATUS AND METHOD FOR CONTROLLING VEHICLE SPEED

CROSS-REFERENCE TO RELATED APPLICATION

This application claims the benefit of priority to Korean Patent Application No. 10-2015-0158352, filed on Nov. 11, 2015 with the Korean Intellectual Property Office, the disclosure of which is incorporated herein in its entirety by reference.

TECHNICAL FIELD

The present disclosure relates to a parking assist apparatus for controlling vehicle speed by reflecting an intention of a driver at a time of assisting in an automatic parking, and a method for controlling vehicle speed.

BACKGROUND

An automatic parking assist system (APAS) may automatically perform a parking by controlling vehicle speed and shifting using an electric stability control (ESC) and a shift by wire (SBW). This is unlike a case in which a smart parking assist system (SPAS), according to the related art, controls only steering using a motor drive power steering (MDPS) to assist in the parking, and a driver takes charge of acceleration and deceleration and shift control of a vehicle. Further, the APAS may perform a parking assist of the driver by controlling the vehicle speed for a vehicle type to which the SBW is not applied.

However, since the APAS according to the related art does not appropriately reflect a parking speed control propensity and intention of the driver at a time of assisting in an automatic parking, APAS may provide inconvenience to the driver.

SUMMARY

The present disclosure has been made to solve the above-mentioned problems occurring in the prior art while advantages achieved by the prior art are maintained intact.

An aspect of the present disclosure provides a parking assist apparatus for controlling vehicle speed according to an intention of a driver at the time of assisting in an automatic parking, and a method for controlling vehicle speed thereof.

According to an exemplary embodiment of the present disclosure, a parking assist apparatus includes a parking switch configured to instruct an execution or a release of a parking assist function; a sensor configured to search a parking slot; and a controller configured to search the parking slot using the sensor when the parking switch is turned on, enter a vehicle speed control mode to check an interface operation by a driver, control vehicle speed according to the interface operation, and perform a parking assist.

The controller may check whether or not a creep driving is possible when an ON state of the parking switch is maintained in the vehicle speed control mode, and controls the vehicle speed according to a vehicle speed control profile when the creep driving is possible.

The controller may control the vehicle speed by a driving torque assist of an engine when the creep driving is impossible.

The vehicle speed control profile may define target vehicle speed for each of parking steps according to a parking type.

The parking assist apparatus may further include a brake operation sensor configured to sense whether or not a brake pedal is operated, wherein when the brake operation sensor senses an operation of the brake pedal by the driver, the controller controls a brake to decelerate the vehicle.

The controller may stop the vehicle by a braking control when the parking switch is turned off in the vehicle speed control mode.

The controller may perform a complete stop by an urgent braking control when the sensor senses a surrounding obstacle in the vehicle speed control mode.

The controller may re-enter the vehicle speed control mode, when the sensor does not sense the obstacle after a predetermined time and the parking switch maintains an ON state, after the vehicle is completely stopped.

The parking assist apparatus may further include a driving apparatus configured to control an engine of the vehicle, wherein the driving apparatus ignores an accelerator input of the driver during an automatic parking control and controls driving torque of the engine according to a control of the controller.

According to another exemplary embodiment of the present disclosure, a method for controlling vehicle speed of a parking assist apparatus includes searching a parking slot, when a parking switch is turned on; entering a vehicle speed control mode when the search of the parking slot is completed; checking an interface operation by a driver at the time of entering the vehicle speed control mode; and performing a parking assist controlling the vehicle speed according to the interface operation.

The performing of the parking assist may include checking whether or not a creep driving is possible when an ON state of the parking switch is maintained in the vehicle speed control mode; and controlling the vehicle speed according to a vehicle speed control profile when the creep driving is possible.

The performing of the parking assist may further include controlling the vehicle speed by adjusting driving torque of an engine, when the creep driving is impossible.

In the performing of the parking assist, when an operation of a brake pedal is sensed in the vehicle speed control mode, deceleration of the vehicle may be controlled.

In the performing of the parking assist, when the parking switch is turned off in the vehicle speed control mode, the vehicle may be stopped by a braking control.

In the performing of the parking assist, when an obstacle around the vehicle is sensed in the vehicle speed control mode, a complete stop may be performed by a braking control.

In the performing of the parking assist, when a sensor does not sense the obstacle after a predetermined time and the parking switch maintains an ON state, after the complete stop, re-entering the vehicle speed control mode may be performed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

Figure 1:
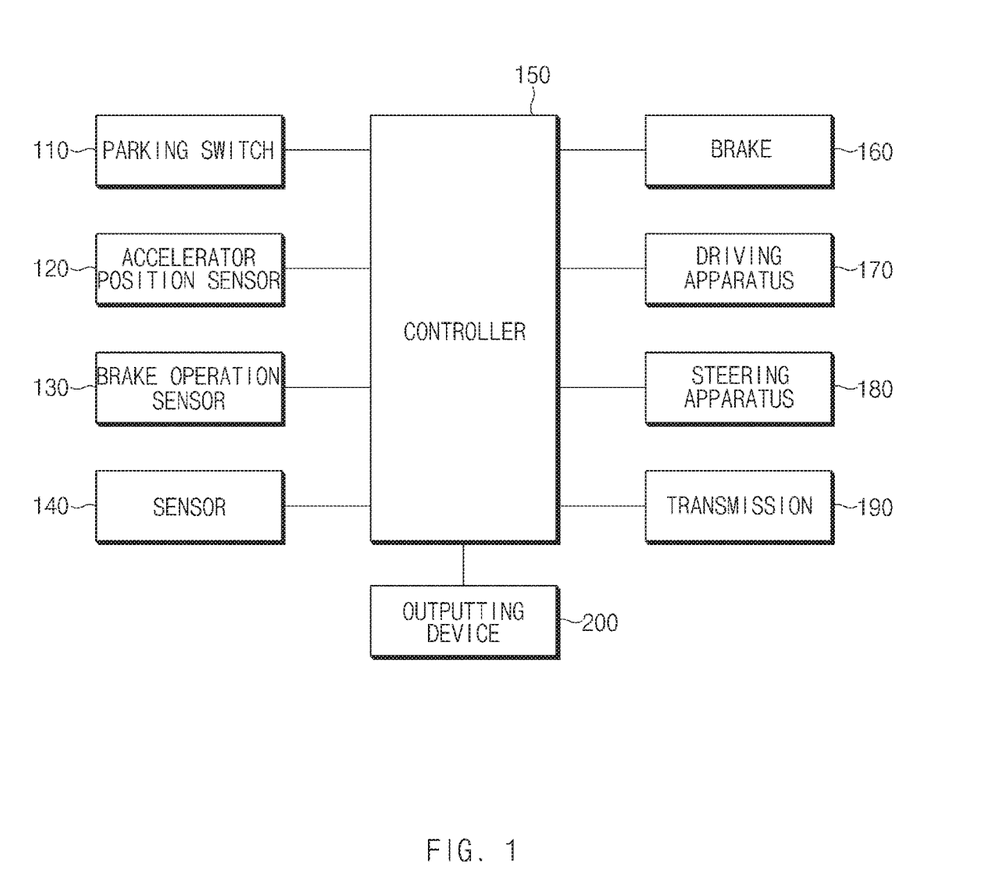
FIG. 1 is a block configuration diagram of a parking assist apparatus according to an exemplary embodiment of the present disclosure.

FIG. 1 illustrates a block configuration diagram of a parking assist apparatus according to an exemplary embodiment of the present disclosure.

As illustrated in FIG. 1, a parking assist apparatus may include a parking switch 110, an accelerator position sensor 120, a brake operation sensor 130, a sensor 140, a controller 150, a brake 160, a driving apparatus 170, a steering apparatus 180, a transmission 190 and an outputting device 200.

The parking switch 110 may generate a control command that instructs an execution or a release of a parking assist according to an operation of a user (e.g., a driver). The parking switch 110 may be implemented as a toggle switch, a dome switch, a button, a jog switch, a touch pad, or the like.

The accelerator position sensor 120 may output a degree that the driver steps on an accelerator as an electrical signal. In other words, the accelerator position sensor 120 may sense (measure) a position of the accelerator in response to an operation of the driver.

The brake operation sensor 130 may sense whether or not a brake pedal is operated by the driver. In addition, the brake operation sensor 130 may sense a degree that the driver steps on the brake pedal. The brake operation sensor 130 may be implemented as a brake switch.

The sensor 140 may sense external environmental information and behavior information of the vehicle. The sensor 140 may include an ultrasonic sensor, radar, lidar, an image sensor, a vehicle speed sensor, a steering angle sensor, a global positioning system (GPS) module, or the like.

When the parking switch 110 is turned on, the controller 150 may search parking slots using the sensor 140 and may select any one of the searched parking slots as a target parking slot. In addition, the controller 150 may generate a parking trajectory for parking the vehicle in the target parking slot, and control the brake 160, the driving apparatus 170, the steering apparatus 180, and the transmission 190 according to the generated parking trajectory to assist in the parking of the vehicle.

When the search of the parking slot is completed, the controller 150 may enter a vehicle speed control mode to control vehicle speed according to an intention of the driver. In other words, the controller 150 may select the parking slot in which the vehicle is to be parked, generate the parking trajectory to the selected parking slot, and then reflect the intention of the driver to control the vehicle speed.

In the case in which the parking switch 110 maintains an ON state for a predetermined time or more after the controller 150 enters the vehicle speed control mode, the controller 150 may check whether or not a creep driving of the vehicle is possible. Here, the creep driving may mean a driving where the driver does not press, or actuate, the accelerator.

When the creep driving is possible, the controller 150 may control the vehicle speed based on the vehicle speed control profile. The controller 150 may adjust a target speed with reference to the vehicle speed control profile at a point of time of a curvature change of the parking trajectory at which a steering is changed in the generated parking trajectory. When the controller 150 receives a request of a gear change after controlling the vehicle speed based on the vehicle speed control profile, the controller 150 may check the gear change and recheck whether or not the creep driving is possible.

Meanwhile, when the creep driving is impossible, the controller 150 may control the driving apparatus 170 to increase driving torque of an engine, and when the vehicle speed exceeds the target speed, the controller 150 may control the vehicle to maintain the target speed using the brake 160.

When the driver switches the parking switch 110 into an OFF state in the vehicle speed control mode, the controller 150 may decelerate the vehicle by a braking control to stop the vehicle.

When the brake operation sensor 130 senses an operation of the brake pedal by the driver in the vehicle speed control mode, the controller 150 may control the brake 160 to decelerate the vehicle speed.

When a resuming intention of the vehicle speed control by the driver is sensed within a defined time period after the controller 150 stops the vehicle using the vehicle speed control, the controller 150 may re-enter the vehicle speed control mode to perform the vehicle speed control. For example, when the parking switch 110 is not turned off within the defined time, or time period, after the vehicle is completely stopped, the controller 150 may re-enter the vehicle speed control mode.

Meanwhile, when the sensor 140 senses obstacles (e.g., pedestrians, vehicles, objects, or the like) around the vehicle at the time of controlling the vehicle speed, the controller 150 may control the brake 160 to control, or facilitate, an urgent braking.

The brake 160, which controls or limits a speed of the vehicle, may be implemented as an electronic stability control (ESC). The brake 160 may control braking pressure according to a position of the brake pedal measured by the brake operation sensor 130. When an automatic parking control is performed, the brake 160 may control the braking pressure to follow a target speed requested by the controller 150.

The driving apparatus 170, which may be an apparatus controlling an engine of the vehicle, may control acceleration and deceleration of the vehicle. The driving apparatus 170 may be implemented as an engine management system (EMS). The driving apparatus 170 may control a driving torque of the engine according to accelerator position information output from the accelerator position sensor 120. When the automatic parking control is performed, the driving apparatus 170 may control an output of the engine to follow a target driving torque requested by the controller 150.

Further, the driving apparatus 170 may transmit the accelerator position information of the driver output from the accelerator position sensor 120 to the controller 150 at the time of performing the automatic parking control, but may not control the driving torque of the engine according to an accelerator input amount and control the output of the engine to follow only the target driving torque by the request of the controller 150. When the automatic parking control is performed, an accelerator input of the driver may be ignored for safety, and the engine output may be entirely controlled by a determination of the controller 150.

The steering apparatus 180, which may control a steering, or a driving direction, of the vehicle, may be implemented as a motor drive power steering (MDPS).

The transmission 190 may serve to shift a gear of the vehicle. The transmission 190 may be implemented as an electronic shifter or a shift by wire (SBW) system.

The outputting device 200, which may output information on an operation state of the vehicle, guidance information for each of parking steps, and the like in any one or more forms of visual information, audible information, and tactile information, may include a cluster, a display, a speaker, an oscillator, and the like.

Figure 2:
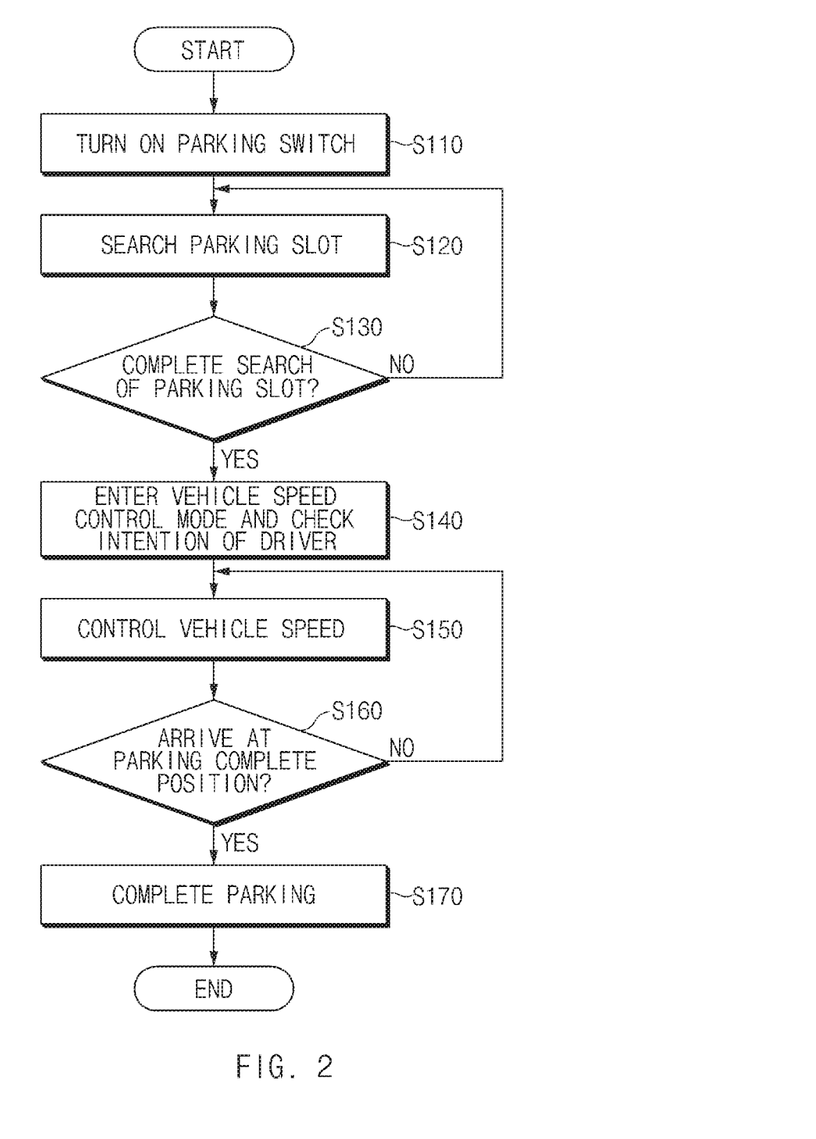
FIG. 2 is a flowchart illustrating a method for controlling vehicle speed of a parking assist apparatus according to an exemplary embodiment of the present disclosure.

FIG. 2 is a flowchart illustrating a method for controlling vehicle speed of a parking assist apparatus according to an exemplary embodiment of the present disclosure.

As illustrated in FIG. 2, the controller 150 of the parking assist apparatus may sense an ON state of the parking switch 110 by the driver (the user) (S110).

When the parking switch 110 is turned on, the controller 150 may search the parking slots using the sensor 140 (S120). The controller 150 may search one or more parking slots and select any one of the searched parking slots as a target parking slot in which the vehicle is to be parked.

When the search of the parking slot is completed, the controller 150 may enter a vehicle speed control mode to check an intention of the driver (S130, S140). In other words, when the target parking slot is determined, the controller 150 may enter the vehicle speed control mode.

The controller 150 may control the vehicle speed by reflecting, or according to, an intention of the driver (S150). Here, the intention of the driver may mean an interface operation by the driver such as an on or off operation of the parking switch 110, an operation of a brake pedal, or an operation of an accelerator.

The controller 150 may control the vehicle speed, perform the parking, and check whether or not the vehicle arrives at a parking complete position (S160). For example, the controller 150 may check whether or not a current position of the vehicle is a 'target position-braking distance' or less.

When the vehicle arrives at the parking complete position, the controller 150 may end a parking assist (S170). For example, when the vehicle arrives at the parking complete position, the controller 150 may control the transmission 190 to switch a shift lever into a 'parking mode'.

Figure 3:
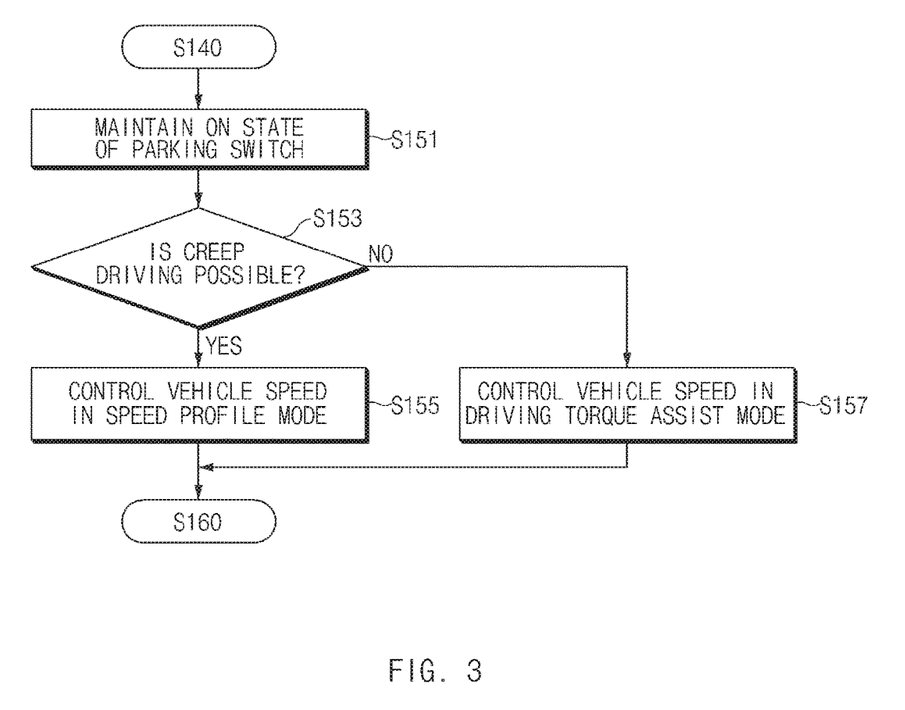
FIG. 3 is a flowchart illustrating a process of controlling vehicle speed according to an embodiment of the present disclosure.

FIG. 3 is a flowchart illustrating a process of controlling vehicle speed illustrated in FIG. 2.

In the case in which the driver maintains an ON state of the parking switch 110 after the controller 150 enters the vehicle speed control mode (S151), the controller 150 may check whether or not a creep driving is possible (S153).

When the creep driving is possible, the controller 150 may control the vehicle speed based on the vehicle speed control profile (a speed profile mode) (S155). The vehicle speed control profile may define the vehicle speed for each of the parking steps according to parking types (e.g., a parallel parking, perpendicular parking, and the like).

When the creep driving is impossible, the controller 150 may control the vehicle speed in a driving torque assist mode (S157).

Figure 4:
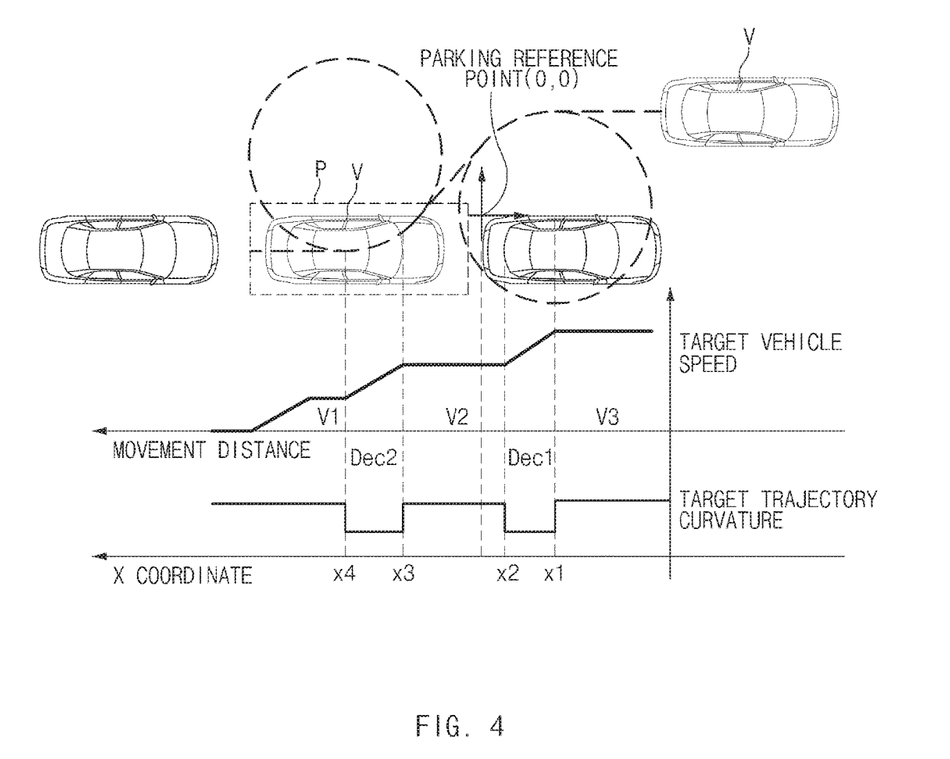
FIG. 4 illustrates a vehicle speed control based on a vehicle speed control profile according to an embodiment of the present disclosure.

FIG. 4 illustrates a vehicle speed control based on a vehicle speed control profile according to embodiments of the present disclosure. In an exemplary embodiment, the parallel parking will be described by way of example.

The controller 150 may generate a parking trajectory for parking a vehicle V to a searched parking slot P. In this case, the controller 150 may generate the parking trajectory using a circle trajectory.

The controller 150 may adjust the vehicle speed at a point of time at which a steering change (operation) is required in the parking trajectory. In other words, the controller 150 may adjust target speed based on the vehicle speed control profile at a point of time at which a curvature is changed in the parking trajectory to control the vehicle speed.

As illustrated in FIG. 4, the vehicle V is backed up, or driven in a reverse gear, at a speed of V3 to a point of x1 at which the curvature is changed and the vehicle speed is adjusted from V3 to V2 in a section from x1 to x2. When the vehicle V maintains the speed of V2 and then arrives at a point of time of a curvature change x3, the vehicle speed is adjusted from V2 to V1 up to a point of x4. The vehicle V maintains the vehicle speed at V1, and when the vehicle V arrives at the parking complete position, the vehicle V may move as much as a braking distance by a braking control and is stopped.

Deceleration in a deceleration section, such as a section of x1 to x2 and a section of x3 to x4, may be determined by a tuning parameter (comfort, sports, or the like).

Figure 5:
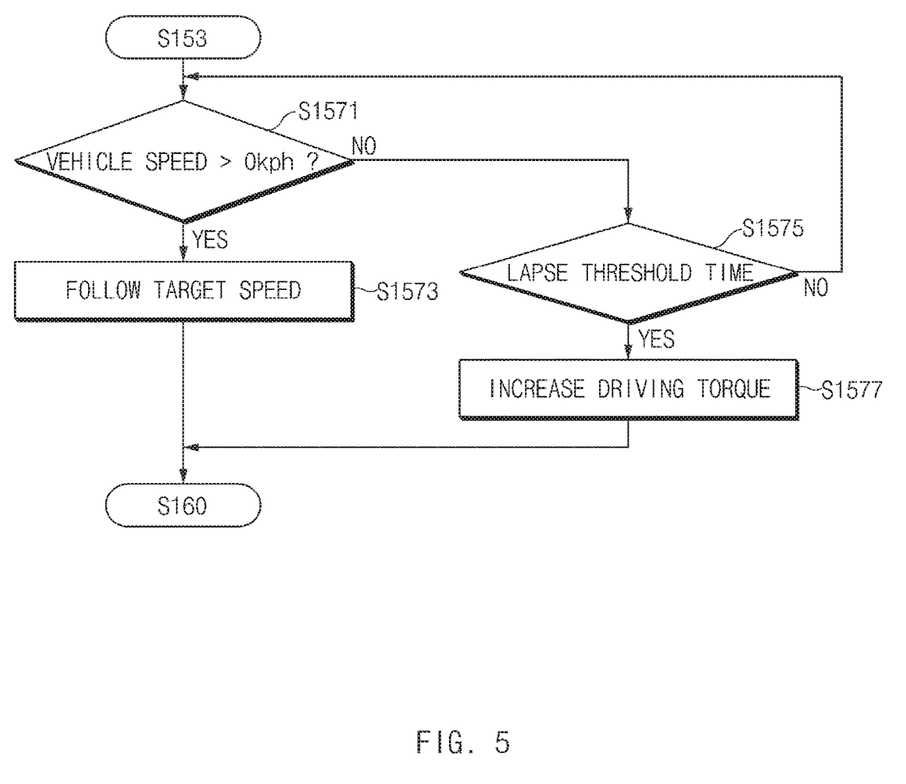
FIG. 5 is a flowchart illustrating a process of controlling vehicle speed in a creep driving impossible state according to the present disclosure.
Figure 6:
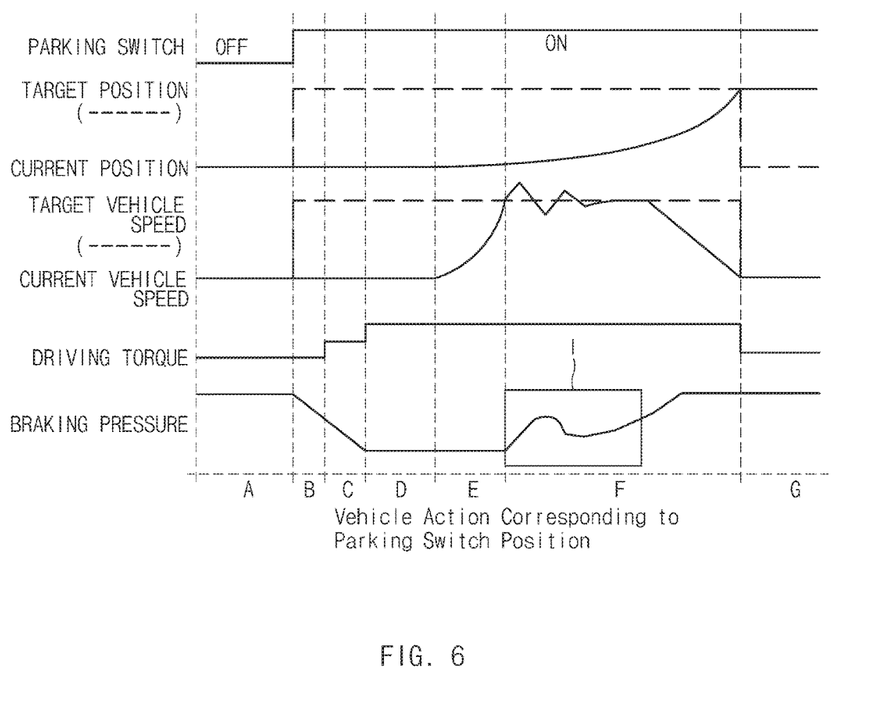
FIG. 6 is a diagram illustrating a vehicle speed control in the creep driving impossible state illustrated in FIG. 5.

FIG. 5 is a flowchart illustrating a process (S157) of controlling a vehicle speed in a creep driving impossible state according to embodiments of the present disclosure and FIG. 6 is a diagram illustrating a vehicle speed control in the creep driving impossible state illustrated in FIG. 5.

Referring to FIG. 5, when the parking switch 110 is in the ON state, but when there is no motion of the vehicle, the controller 150 may determine whether or not the vehicle maintains a stop state for a predetermined time (S1571).

If the vehicle starts to move, the controller 150 may control the driving apparatus 170 and control the vehicle speed to follow the target speed (S1573).

If the vehicle maintains the stop state until a threshold time lapses, the controller 150 may control the driving apparatus 170 to increase the driving torque of the engine (S1575, S1577).

Referring to FIG. 6, the creep driving impossible state (a section of B to C) may refer to a state in which the driver turns on the parking switch 110 in a state in which the vehicle is stopped (a section of A), and takes a driver's foot off the brake pedal, but the vehicle does not move.

If the vehicle maintains the stop state until the threshold time lapses, the driving torque may be increased (a section of C). In such a case, the driving apparatus 170 may increase the driving torque by a predetermined amount at a predetermined time unit until the vehicle speed arrives at the target speed.

If the vehicle speed exceeds the target speed as in a section of F, the controller 150 may control the brake 160 to adjust braking pressure, thereby allowing the vehicle speed to be maintained at the target speed (I).

If the vehicle approaches a target position, the controller 150 may control the brake 160 to increase the braking pressure, thereby stopping the vehicle. That is, if the vehicle enters within a predetermined radius from the target position, the controller 150 may perform a braking control using the brake 160.

As described above, according to an exemplary embodiments of the present disclosure, since the vehicle speed may be controlled by reflecting, or according to, the intention of the driver at the time of assisting in the automatic parking, a more safe and convenient parking assist may be provided to the driver Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A parking assist apparatus comprising:
    a parking switch for instructing an execution or a release of a parking assist function;
    a sensor for searching a parking slot;
    an accelerator position sensor for sensing position of an accelerator;
    a brake operation sensor for sending whether a brake pedal is operated; and
    a controller for searching the parking slot using the sensor when the parking switch is turned on, entering a vehicle speed control mode to check an accelerator operation or brake pedal operation by a driver using the accelerator position sensor and the brake operation sensor, controlling vehicle speed according to the accelerator operation or brake pedal operation, and performing a parking assist, wherein the controller checks whether or not creep driving is possible when an ON state of the parking switch is maintained in the vehicle speed control mode, and controls the vehicle speed according to a vehicle speed control profile when the creep driving is possible.

2. The parking assist apparatus according to claim 1, wherein the controller controls the vehicle speed by a driving torque assist of an engine when the creep driving is impossible.

3. The parking assist apparatus according to claim 1, wherein the vehicle speed control profile defines a target vehicle speed for each of one or more parking steps according to one or more parking types.

4. The parking assist apparatus according to claim 1, wherein when the brake operation sensor senses an operation of the brake pedal by the driver, the controller controls a brake to decelerate the vehicle.

5. The parking assist apparatus according to claim 1, wherein the controller stops the vehicle by a braking control when the parking switch is turned off in the vehicle speed control mode.

6. The parking assist apparatus according to claim 1, wherein the controller performs a complete stop by an urgent braking control when the sensor senses a surrounding obstacle in the vehicle speed control mode.

7. The parking assist apparatus according to claim 6, wherein the controller re-enters the vehicle speed control mode, when the sensor does not sense the obstacle after a predetermined time and the parking switch maintains an ON state, after the vehicle is completely stopped.

8. The parking assist apparatus according to claim 1, further comprising a driving apparatus for controlling an engine of the vehicle,
    wherein the driving apparatus ignores an accelerator input from the driver during an automatic parking control and controls driving torque of the engine according to a control of the controller.

9. A method for controlling vehicle speed by a parking assist apparatus, the method comprising:
    searching, by a sensor communicably coupled to a controller, a parking slot when a parking switch is turned on;
    entering a vehicle speed control mode, using the controller, when the search of the parking slot is completed;
    checking, at a time of entering the vehicle speed control mode, an accelerator operation by a driver using an accelerator position sensor or a brake pedal operation by the driver using a brake operation sensor; and
    performing, by the controller, a parking assist controlling the vehicle speed according to the accelerator operation or the brake pedal operation, wherein performing the parking assist includes controlling the vehicle speed according to a vehicle speed control profile when creep driving is possible.

10. The method according to claim 9, wherein the step of performing the parking assist further includes:
    checking whether or not the creep driving is possible when an ON state of the parking switch is maintained in the vehicle speed control mode.

11. The method according to claim 10, wherein the step of performing the parking assist further includes controlling the vehicle speed by adjusting driving torque of an engine, when the creep driving is impossible.

12. The method according to claim 9, wherein in the step of performing the parking assist, when the brake pedal operation is sensed in the vehicle speed control mode, deceleration of the vehicle is controlled.

13. The method according to claim 9, wherein in the step of performing the parking assist, when the parking switch is turned off in the vehicle speed control mode, the vehicle is stopped by a braking control.

14. The method according to claim 9, wherein in the step of performing the parking assist, when an obstacle around the vehicle is sensed in the vehicle speed control mode, a complete stop is performed by a braking control.

15. The method according to claim 14, wherein in the step of performing the parking assist, when a sensor does not sense the obstacle after a predetermined time and the parking switch maintains an ON state, after the complete stop, re-entering the vehicle speed control mode is performed.

* * * * *